Aug. 14, 1934.  G. F. DRAKE  1,969,733

CONTROL FOR HEATING SYSTEMS

Filed Feb. 6, 1932  3 Sheets-Sheet 1

INVENTOR
George Forrest Drake
BY
Lindahl, Parker + Carlson
ATTORNEYS

Aug. 14, 1934.   G. F. DRAKE   1,969,733
CONTROL FOR HEATING SYSTEMS
Filed Feb. 6, 1932   3 Sheets-Sheet 2
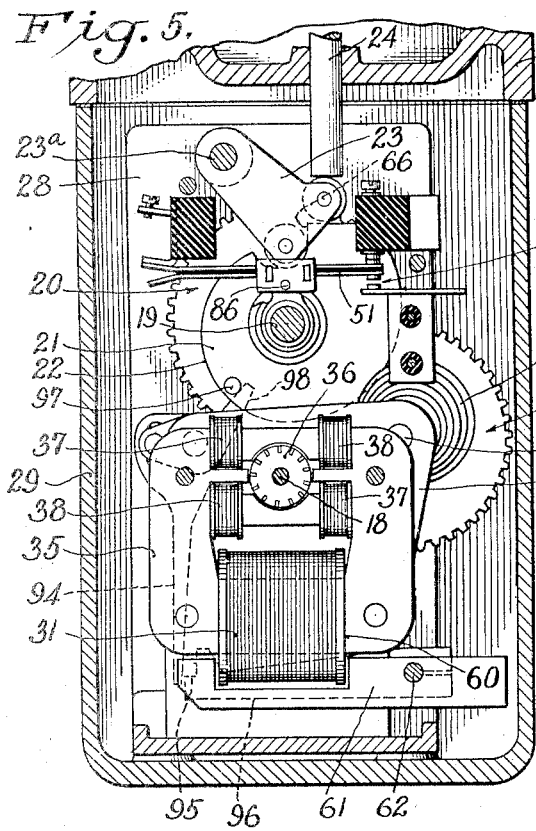
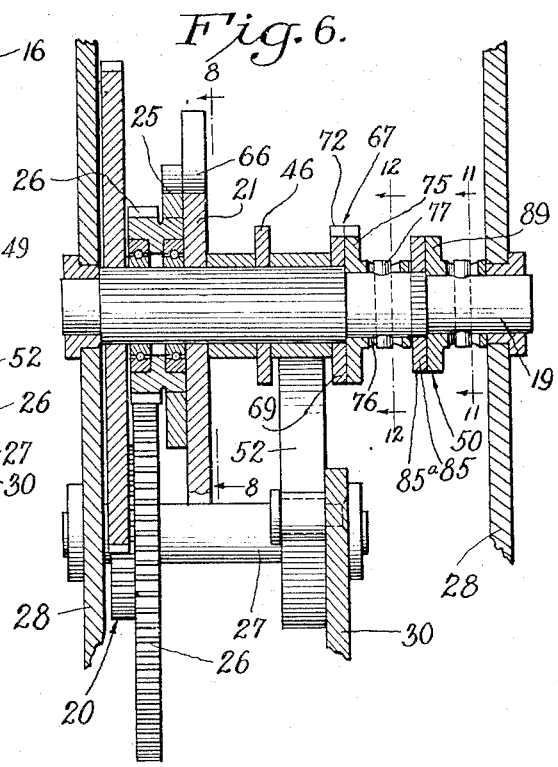
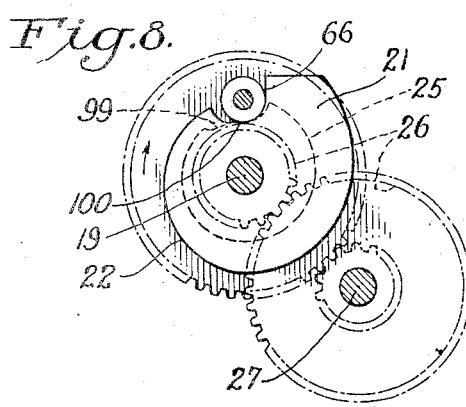
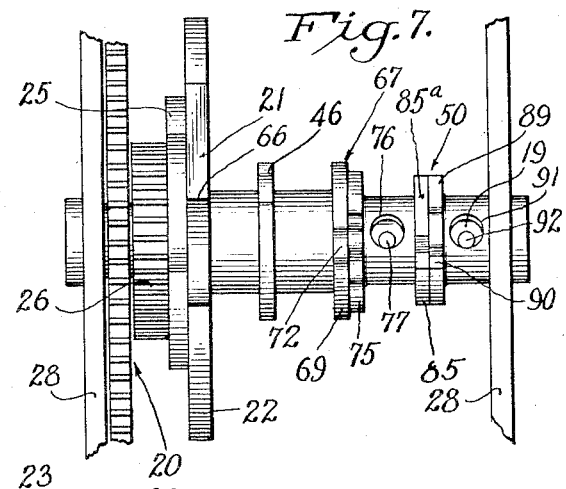
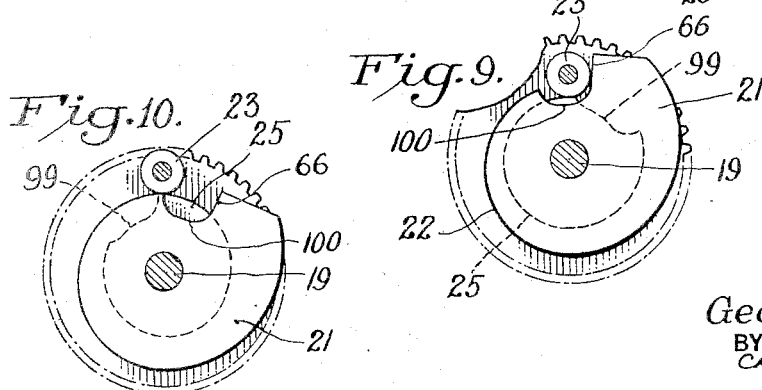
INVENTOR
George Forrest Drake
ATTORNEYS

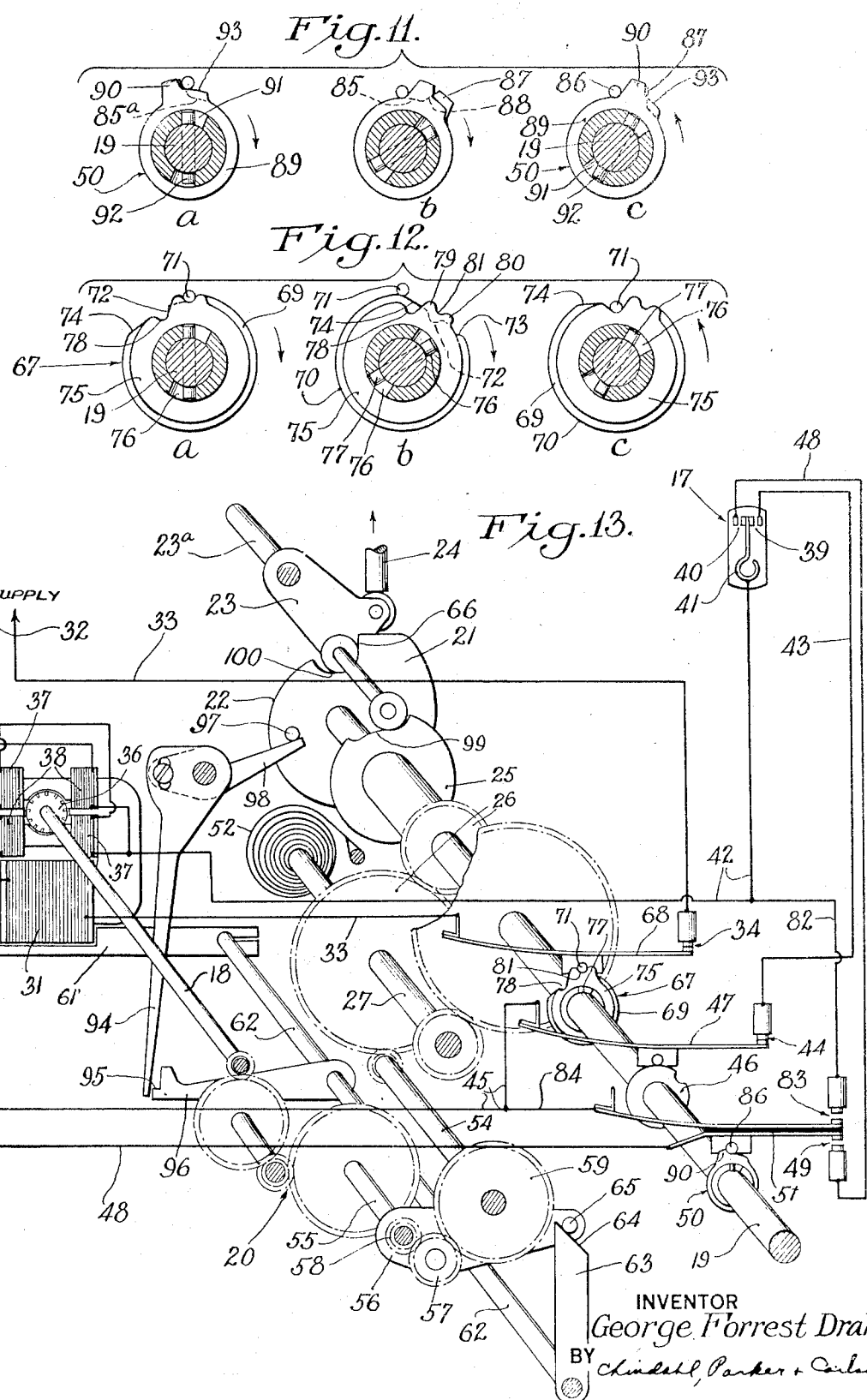

Patented Aug. 14, 1934

1,969,733

UNITED STATES PATENT OFFICE 1,969,733

CONTROL FOR HEATING SYSTEMS

George Forrest Drake, Rockford, Ill., assignor to Howard D. Colman, Rockford, Ill.

Application February 6, 1932, Serial No. 591,355

34 Claims. (Cl. 236—74)

This invention relates to the control of a damper, valve or other device for regulating the amount of heat supplied by a heating system in accordance with temperature changes within the space heated by the system. More particularly the invention has reference to a control system of the type in which an electrically driven regulating device is moved back and forth between fully operative and partially operative positions under thermostatic control during the existence of normal conditions in the system but is moved to inoperative position upon the occurrence of an abnormal condition such as failure of the electric current supply.

One object of the invention is to provide a novel mechanism for detecting a condition tending to produce overheating in the space heated by a system of the above character and for controlling the electric operator to cause the regulating device actuated thereby to be moved to inoperative position.

The invention also resides in the manner of controlling the electric operator to restore normal operating conditions following movement of the regulating device to inoperative position as a result of current failure or the abnormal condition above referred to.

Other objects and advantages of the invention will become apparent from the following detailed description taken in connection with the accompanying drawings, in which Figure 1 is a perspective view of an electrically driven regulating device embodying the features of the present invention.

Figure 3:
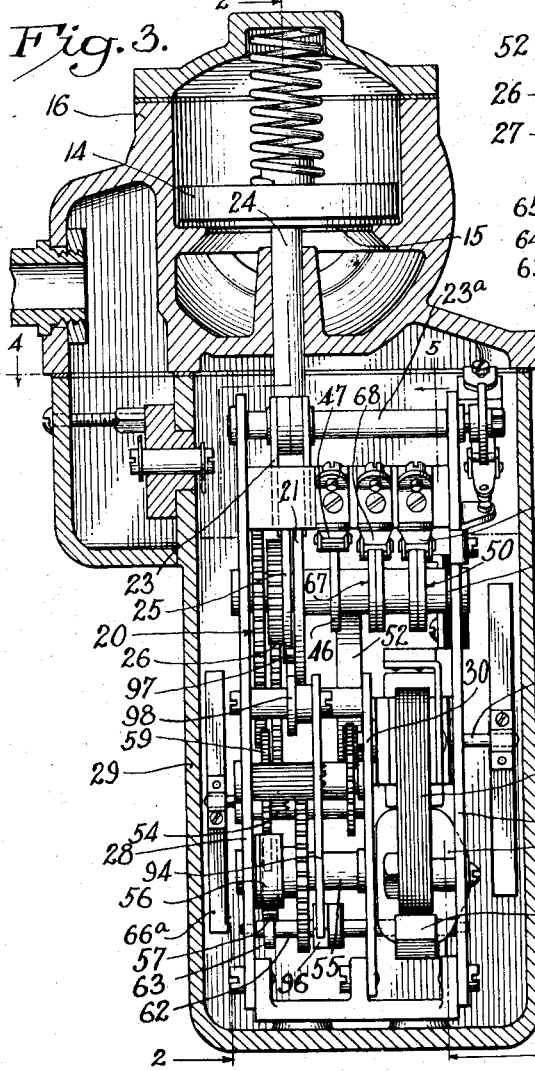
Fig. 3 is a sectional view taken along the line 3—3 of Fig. 2.
Figure 4:
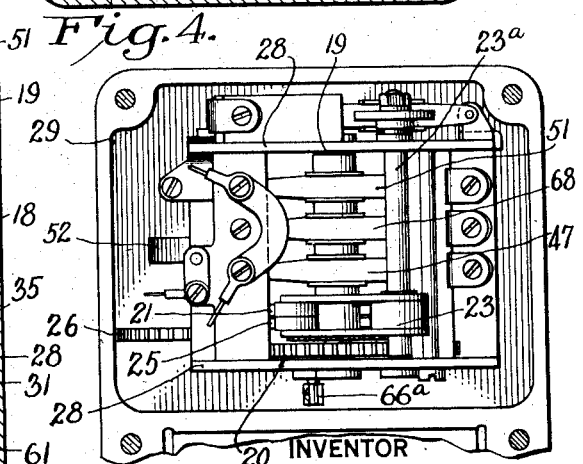

Figs. 4 and 5 are sectional views taken respectively along the lines 4—4 and 5—5 of Fig. 3.

Fig. 6 is a fragmentary cross-sectional view of the main operating shaft of the electric operator.

Fig. 7 is a plan view of the main operating shaft.

Figs. 8, 9 and 10 are sectional views taken substantially along the line 8—8 of Fig. 6 showing different positions of the main operating cams.

Figs. 11 and 12 are sectional views taken along the lines 11—11 and 12—12 of Fig. 6 showing different cam positions.

Fig. 13 is a schematic view and wiring diagram.

In the form shown in the drawings by way of illustration, the regulating device to be controlled is in the form of a valve disk 14 movable toward and away from a seat 15 in a valve body 16 which is interposed in a feed line leading to a gaseous fuel burner (not shown). With such a regulating device, the amount of heat supplied by the system is proportional to the degree of opening of the valve being a minimum when the valve is closed as shown in full lines and a maximum when the valve is positioned as shown in dotted outline in Fig. 2.

The invention contemplates actuation of the valve member by an electrically driven operator acting automatically first, to maintain the valve open to a predetermined degree, for example, twenty-five percent of its full extent of opening under normal conditions; secondly, to effect slow and graduated movement of the valve member in opposite directions between such partially and fully open positions in response to temperature changes in the space to be heated as detected by a thermostat 17 (Fig. 13); thirdly, to cause complete closure of the valve upon the occurrence of abnormal conditions such as failure of the current supply; and fourthly, to cause immediate restoration to the control of the thermostat when normal conditions are again resumed.

Figure 1:
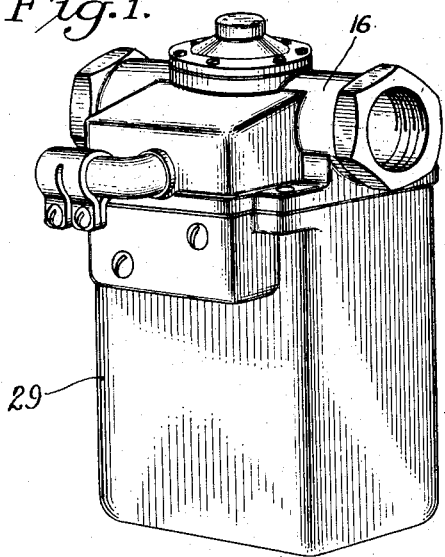
Figure 2:
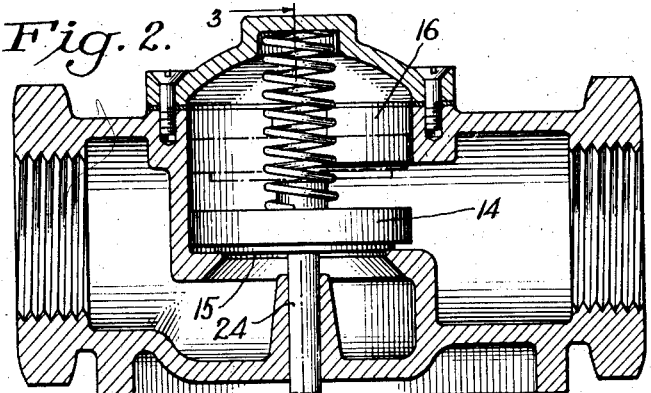
Fig. 2 is a sectional view of the operator and regulating device taken substantially along the line 2—2 of Fig. 3.

The valve operator herein employed includes electric driving means in the form of a motor having a shaft 18 connected to a main operating shaft 19 through a train of speed reduction gears 20. Fast on the shaft 19 is a cam 21 whose gradually rising surface 22 acts upon the roller of a follower 23 pivoted at 23ᵃ and acting during oscillation of the shaft 19 to raise and lower the follower, and the stem 24 of the valve member 14 on which the follower acts, in accordance with the extent of movement of the shaft relative to a limit valve-closed position (Fig. 2). Preferably, though not necessarily, the lowermost point on the cam surface 22 determines the predetermined partially-open position above referred to and movement of the valve from closed to partially-open position is caused by a cam 25 also acting on the follower 23 and driven at a higher speed than the cam 21 by gears 26 interposed between the cam 25 and an intermediate shaft 27 of the gear train 20. The motor and all of the rotary parts are supported by two spaced frame plates 28 within a casing 29 preferably containing lubricating oil.

In the present instance, the motor is of the reversible induction type and per se forms the subject matter of a copending application of Edgar D. Lilja, Serial No. 540,643, filed May 28, 1931. It is mounted between one of the side plates 28 and the plate 30 and has a main field winding 31 adapted to be energized from a source 32 of alternating current through a conductor 33 having a normally-closed contact switch 34 interposed therein. The stator 35 is of the core type providing two poles on opposite sides of a squirrel-cage rotor 36 preferably having its inductor bars exposed at the rotor surface.

Shifting of the magnetic field around the rotor is produced by the well known action of shading coils each enclosing one side portion of one motor pole and composed, in the present instance, of a relatively large number of turns of wire so as to reduce to a low value the current which flows through the thermostat switches. The coils are arranged in pairs 37 and 38 with the coils of each pair connected in series relation and disposed on diametrically opposite sides of the rotor.

When the winding formed by the coils 37 is rendered effectual by short-circuiting the same, the magnetic flux threading the sections of the poles enclosed by these coils will lag behind the flux threading the unshaded sections enclosed by the coils 38 and produce shifting of the magnetic field around the rotor in a clockwise direction causing rotation of the rotor in the same direction and movement of the valve member 14 away from its seat. In a similar way, counter-clockwise rotation of the rotor and closing of the valve takes place when the coils 38 are short-circuited with the circuit including the coils 37 remaining open. Owing to the poor single phase characteristics possessed by the motor above described, rotation thereof will cease when the circuits for both pairs of coils are interrupted and the position of the valve will be maintained by the friction in the speed-reducing gearing.

Selective short-circuiting of the coils 37 and 38 is controlled by the thermostat 17 which has two switches 39 and 40 with a common terminal carried by a thermo-responsive element 41 and disposed between the stationary switch contacts when the proper temperature prevails. When the thermostat is calling for heat, the switch 39 is closed thereby completing a circuit from the common terminal of the shading coils through a conductor 42, the switch 39, a conductor 43, a contact switch 44, a conductor 45 leading to the insulated terminal of the coils 37. Completion of this circuit, if the winding 31 is then energized, initiates operation of the motor in a direction to open the valve and thereby increases the amount of heat supplied by the burner. The switch 44 merely serves to limit the valve-opening movement of the motor and for all positions of the valve other than fully open position is maintained closed by a cam 46 on the shaft 19 acting on a follower arm 47 carrying the movable contact of the switch 44. When the shaft reaches valve-open position, a notch in the cam is presented to the follower allowing the switch 44 to open.

For a similar reason, the insulated terminal of the windings 38 which control the valve-closing operation of the motor is connected to the stationary contact of the closed-when-hot thermostat switch 40 through the medium of a conductor 48 having a limit switch 49 interposed therein. As will more fully appear later, a cam 50 on the shaft 19 acts on a follower arm 51 carrying the movable contact of the switch 49 to maintain the switch closed when the valve is opened beyond the predetermined position above referred to and to hold the switch open when the valve is disposed between closed and said partially-open positions. Thus, when both of the limit switches 44 and 49 are closed, the motor will operate under the control of the thermostat to move the valve back and forth variable distances between partially-open and fully-open positions according to the heating requirements in the space being heated, the valve being held in an intermediate position when both of the thermostat switches are open.

To provide for absolute safety in the control of the burner of the heating system with the electric operator above described, means is provided for detecting failure of the current supply at the motor and in response to such failure for releasing the normally engaged driving connection between the motor and the shaft 19, thereby permitting the latter to be restored to valve-closed position. Herein the disengageable connection is located intermediate the terminals of the speed-reduction gearing 20 so that the shaft 19 may be restored to valve-closed position by a spring 52 which herein is of spiral form acting upon the shaft 27.

The disengageable connection is located between the shafts 54 and 55 of the speed-reduction train and the spring 52 is constructed to exert a force capable of restoring the slow speed section of the gear train to valve-closed position when the connection is disengaged but is incapable of overcoming the friction in all of the gears and moving the same when the connection is engaged. The connection comprises an arm 56 swingable about the axis of the shaft 55 and carrying a gear 57 constantly meshing with a pinion 58 on the shaft and also meshing with a gear 59 on the shaft 54 when the arm is in raised position as shown in Fig. 13.

Normally the arm 56 is held in such raised position by a magnet which is adapted to detect failure of the current supply and release the arm. Inasmuch as the main winding 31 of the motor is constantly energized under normal conditions in the present instance, this winding and the core 60 thereof may constitute the magnet just referred to. The magnet armature is in the form of an arm 61 rigid with a rock shaft 62 and having one side cut away to receive the winding 31 so that the opposite ends of the armature will lie close to the core 60 when the armature is energized and thereby attracted to the core. The attractive force thus produced by the magnetic field which strays around the winding 31 is sufficiently powerful to raise the armature and cause meshing of the gears owing to the location of the disengageable gears in a relatively high speed portion of the gear train. On the opposite end of the rock shaft 62 is an arm 63 having a cam surface 64 which acts on a pin 65 and holds the arm 56 raised so long as the armature 61 is held up against the winding core 60 as shown in Fig. 13.

In the event of voltage failure, the armature falls, retracting the cam surface 64 and allowing the arm 56 to fall and carry the gear 57 out of mesh with the gear 59 whereupon the spring 52 will become effective to rotate the shaft 19 until the valve reaches closed position, movement of the shaft 19 being limited by engagement between the follower 23 and an abrupt surface 66 on the cam 21. When current is again available and applied to the winding 31, the armature 61 will be attracted to the core 60 whereupon the driving connection between the motor and the shaft 19 will be reestablished.

If the parts actuated by the spring 52 upon release of the disengageable connection were allowed to turn freely, considerable momentum would be acquired during closing of the valve. To moderate the spring action and avoid stripping of the teeth from any of the gears when the stop surface 66 engages the follower 23, a paddle wheel 66$^a$ is mounted on the shaft 54 so as to rotate in the oil bath.

It is contemplated that the amount of gas supplied to the burner of the heating system when the valve is in the predetermined partially-open position above referred to, will not be sufficient to satisfy the ordinary demands upon the system so that normally the burner will operate with the valve opened beyond such partially-open position. In very mild weather, the thermostat may cease to call for heat for an interval of time sufficient to close the valve to the predetermined partially-open position and prolonged operation of the burner with the valve so positioned would tend to produce overheating in the space being heated by the system. In such event, it is desirable to reduce the fuel supply still further.

The present invention contemplates utilizing the movement of the valve into the predetermined partially-open position upon closing as an indication of a condition in the system tending to produce overheating and in response to such movement to cause immediate and complete closure of the valve and maintenance of this condition until the thermostat again calls for heat. For the sake of structural simplicity, closure of the valve under such a condition is accomplished in the same manner as in the case of current failure and to this end means is provided for opening the switch 34 in the circuit of the motor winding 31 as an incident to closing movement of the valve to its predetermined partially open position. This means comprises a cam 67 on the shaft 19 acting on a follower 68 carrying the movable contact of the switch 34 and constructed so as to allow the switch to open at the proper position of the valve during closing but to maintain the switch closed while the valve is passing such position upon opening.

Referring now to Fig. 12, the cam 67 includes a disk 69 fast on the shaft 19 having a surface 70 concentric with the shaft and acting, when engaging a pin 71 on the follower, to maintain the switch 34 closed. Between the ends of the surface 70, the disk 69 is indented by a notch 72 positioned to come opposite the follower pin when the valve is in the predetermined position above referred to. The notch is of sufficient depth to allow the switch 34 to open and its edges are joined to the surface 70 by sloping surfaces 73 and 74.

To carry the follower pin 71 over the notch 72 during opening of the valve while permitting the pin to drop into the notch during closing of the valve, a second disk 75 carried by the shaft 19 is adapted for a limited degree of lost motion relative thereto as determined by the circumferential length of slots 76 in the hub of the disk 75 in which slots project the ends of a cross-pin 77 on the shaft. The disk 75 is formed with a notch 78 which coincides with the notch 72 (Figs. 12$^a$ and 12$^b$) when the disk is moved to the extent of its movement in a clockwise direction relative to the disk 69. Adjacent the notch 78, the disk 75 is formed with two lugs 79 and 80 which terminate at substantially the same distance from the disk axis as the surface 70 of the disk 69. Between these lugs is a notch 81 which coincides with the notch 72 when the disk 75 is at the other limit of its movement relative to the disk 69 (see Fig. 12$^b$) but which is too shallow to allow the switch 34 to open when the pin 71 is disposed therein. As will more fully appear later, the follower pin enters the notch 81 when the valve reaches completely closed position and remains in the notch during shifting of the disk 75 which takes place while the valve is being opened beyond the predetermined position, the pin being thereby carried over the notch 72.

In order that the heat regulating device will, under normal conditions, always be open at least to the predetermined position above referred to, means is provided for initiating operation of the motor in a direction to open the valve when the thermostat calls for heat after the valve has been completely closed in the manner above described and for continuing such operation independently of the thermostat control until the valve has been opened beyond the predetermined position above referred to. This means includes, in the present instance, an auxiliary circuit for the motor coils 37 interposed in parallel with the switch 44 and the thermostat 39 and adapted to be completed by the initial movement of the shaft 19 in a direction to move the valve out of closed position. The circuit is formed by a conductor 82 leading from the conductor 42 to the stationary contact of a switch 83, the movable contact of which is connected by a conductor 84 to the conductor 45 and mounted on the follower arm 51 but insulated from the movable contact of the switch 49. It will be apparent that the auxiliary circuit will be established and the motor operated in a direction to open the valve whenever the switch 83 is closed provided the main motor winding is then energized.

The cam 50 by which the switches 49 and 83 are actuated is constructed to maintain both switches open when the shaft 19 is in valve-closed position, to close the switch 83 upon initial valve-opening movement of the shaft, to open the switch 83 and substantially simultaneously close the switch 49 after the valve has been opened beyond the predetermined partially-open position above referred to and finally to maintain the switch 49 closed during closing of the valve until the predetermined position has been reached. For this purpose, the cam 50 (see Fig. 11) comprises a disk 85 fast upon the shaft 19 and having a surface 85$^a$ which, when engaging a pin 86 on the follower arm 51, allows the switch 83 to be opened and the switch 49 to be closed. Rising from the surface 85$^a$ is a projection 87 whose surface 88 is positioned to be presented to the pin 86 at the time when the valve is passing through the predetermined position above referred to and when the notch 72 in the cam 69 is passing the pin 71.

Adjacent the disk 85 is a second disk 89 having a projection 90 of substantially the same shape but slightly longer than the projection 87. Slots 91 in the hub of the disk and a cross-pin 92 form a lost motion connection between the disk which permits the disk to move relative to the disk 85 from one extreme position (Fig. 11$^a$) in which the projections 87 and 90 substantially coincide to the other limit position (Fig. 11$^b$) in which the outer segmental surfaces of the projections form a substantially continuous surface which, during movement of the valve away from closed position, holds the switch 83 closed until the valve has been opened substantially beyond the predetermined partially-open position. During closing of the valve, the disk 89 is shifted into the position shown in Fig. 11ᶜ so that opening of the switch 49 and closing of the switch 83 is delayed until the predetermined position of the valve has been reached. In order that the switch 49 as well as the switch 83 will be held open when the shaft 19 is in valve-closing position and the movement of the shaft under the control of the thermostat switch 40 thereby limited, the loose disk 89 has a surface 93 which, when engaging the pin 86 as shown in Fig. 11ᵃ, holds the follower arm 51 midway between the stationary contacts of the two switches 49 and 83.

In order that the switch 34 may be closed before the valve reaches closed position and the operator thereby conditioned for opening of the valve when the thermostat again calls for heat, means is provided for preventing reengagement of the driving connection between the motor and the shaft 19 until the latter has moved completely to valve-closing position. This is accomplished mechanically in the present instance by a latch 94 (Fig. 13) with its lower end adapted to engage behind a shoulder 95 on an arm 96 rigid with the rock shaft 62. So long as the motor winding is energized, the arm 96 is held in raised position and the latch is held inactive. When the arm drops upon deenergization of the motor winding, the latch moves in behind the shoulder 95 thereby preventing immediate reengagement of the driving connection when the switch 34 is closed as above described. As the shaft 19 approaches valve-closed position, a projection 97 on the cam 21 engages an arm 98 on the latch lever withdrawing the latch to the position shown in Fig. 13 so that the connection is restored.

Prior to the time when the auxiliary circuit for the windings 37 is completed by closure of the switch 83, the motor is under the control of the thermostat switch 39 which may close only momentarily and not cause sufficient movement of the shaft 19 to close the switch 83. In order therefore to prevent the valve from being left in a slightly open position such as might result in ignition failure, it is desirable to delay opening of the valve in the initial valve-opening movement of the shaft 19 until the switch 83 has been closed and thereby taken exclusive control of the motor. This may be accomplished by providing for a limited degree of lost motion between the cam 25 and the valve so that the shaft 19, in starting from valve-closing position, moves a short distance before the valve is raised from its seat. Herein the lost motion is obtained by forming dwell surfaces 99 and 100 on the cams 25 and 21 in positions to engage the follower in the initial movement of the shaft 19 and allow a slight movement of the latter while the cam projection 87 is raising the follower 51 to close the switch 83.

Operation

The operator above described functions as follows, assuming that the valve is closed, that current is available, that the predetermined position above referred to is 25 percent of full valve opening and that the switch 83 will be allowed to open by the cam 50 when the valve is 30 percent open. Under these conditions the parts would be positioned as shown in Figs. 8, 11ᵃ, 12ᵃ and 13 with the switches 49 and 83 open and the switches 34 and 44 closed. Now when the thermostat calls for heat, closure of the switch 39 completes a circuit through the switch 44 and the shading coils 37 thereby initiating operation of the motor to turn the shaft 19 in a clockwise direction. Owing to the dwell surface 99 on the cam 25, the valve remains seated in the initial movement of the shaft 19 during which the projections 87 and 90 engage the pin 86 raising the follower 51 to close the switch 83 just as the cam starts to raise the follower 23 as shown in Fig. 10. Completion of this auxiliary circuit for the shading coils 37 continues the operation of the motor independently of the thermostat switch 39 and after one revolution of the cam 25, the cam 21 becomes active (see Fig. 9) to control the movements of the valve.

In the continued motion of the shaft 19, the pin 71, acting on the projection 79, holds the disk 75 stationary until the lost motion between the disks 69 and 71 has been taken up. In such shifting of the disk 75 relative to the disk 69 into the position shown in Fig. 12ᵇ, the pin 71 is carried across the notch 72 after which the pin rides over the projection 79 as the valve passes 25 percent open position and onto the surface 74 finally engaging the surface 70 as the valve reaches 30 percent open position. During such movement, the switch 34 is maintained closed. In the same movement, the pin 86, engaging the leading edge of the projection 90 holds the cam disk 89 stationary as the pin 86 rides along the outer surface of the projection 87. When all of the lost motion between the disks 84 and 89 has been taken up, the surface of the projection 90 will (see Fig. 11ᵇ) form a prolongation of the surface of the projection 87. The pin 86 engages this prolongation as the valve 14 passes the 25 percent open position. The pin 86 then rides along the surface of the projection 90 passing the trailing end thereof as the 30 percent open position is reached whereupon movement of the pin 86 allows the switch 83 to open and the switch 49 to close with a snap action, the parts then being positioned as shown in Fig. 11ᶜ. By thus holding the switch 83 closed until after the valve passes beyond the position at which the switch 34 is opened by the cam 67, accurate setting of the cam 50 is avoided.

The switches 44 and 49 now being closed and the switch 83 open, the operator is under the exclusive control of the thermostat 17 so that under normal conditions the valve will move slowly back and forth between fully open and 25 percent open positions according to the demands on the system as determined by temperature changes in the space surrounding the thermostat.

Now assume that the thermostat ceases to call for heat for a period of time sufficient to move the valve to 25 percent open position. As the shaft 19 approaches such position rotating in a counter-clockwise direction as viewed in Fig. 13, the pin 71 rides down the surface 74 engaging the projection 79 and shifting the disk 75 relative to the disk 69. When the 25 percent open position is reached, the notches 72 and 78 of the two disks coincide (Fig. 12ᶜ) and the pin 71 enters the same allowing the follower arm 68 to drop and open the switch 34. This deenergizes the motor winding whereupon the drive connection is disengaged permitting the spring 52 to turn the shaft 19 and the associated gearing to valve-closed position. As the valve is approaching the 25 percent open position in closing, the pin 86 engages the projection 90 and shifts the disk 89 so that at such position, the projections 87 and 90 coincide as shown in Fig. 11°. In further movement of the shaft 19 by the spring 52, the pin 86 rides over the projections first opening the switch 49 and closing the switch 83 and then opening the switch 83 as the disk 89 comes to rest with the pin 86 engaging the surface 93 (see Fig. 11ª).

Similar operation of the cams and switches occurs when the valve is completely closed as a result of deenergization of the motor winding due to current failure.

It will be apparent that all of the abnormal conditions normally encountered in the service use of a regulating device of the character described are provided for in the control system above described. By using the operator itself as a means for detecting a condition of the system tending to produce overheating, a simple thermostat of standard construction may be employed and actual overheating in the space being heated by the system does not need to occur before the final supply to the burner is interrupted. Extremely accurate regulation of the temperature in the space heated by the system is therefore obtained.

No claim is made herein to any subject matter common to this application and co-pending application Serial No. 574,474, filed November 12, 1931 by myself and Duncan J. Stewart.

I claim as my invention:

1. In a heating system, the combination of a regulating valve-member, electric motor driving means arranged to move said member in opposite directions between open and closed positions to vary at a slow and graduated rate the amount of heat supplied by said system, thermostatic means normally controlling said driving means to determine the extent and direction of movement of said member, and control means responsive to the movement of said member and operable upon movement of the member into a predetermined partially-open position upon closing to cause immediate and rapid movement of the member to closed position.

2. In a heating system, the combination of a regulating device movable in opposite directions between two limit positions through a predetermined intermediate position, an electrically driven operator for actuating said device, thermostatic means responsive to temperature changes in the space heated by said system and operable to control said operator when said device is between said intermediate position and one of said limit positions and determine the direction and extent of movement of the device, and means operable as an incident to movement of said device away from said last mentioned limit position and into said intermediate position to cause movement of said device to said other limit position independently of the control by said thermostatic means.

3. In a heating system, the combination with a regulating device normally tending to move in a direction to decrease the amount of heat supplied by the system, thermostatically controlled electric driving means for said device, electromagnetically controlled means normally energized to maintain a driving relation between said device and said driving means but releasable to permit of movement of the device independently of the driving means, and means responsive to the movements of said device for controlling the energization of said electromagnetically controlled means.

4. In a heating system, the combination of a device movable in opposite directions between open and closed positions to regulate the operation of a fuel burner in said system and normally tending to move toward said closed position, electric motor driving means operable in opposite directions, means providing a disengageable driving connection between said driving means and said device, electromagnetically controlled means normally energized to maintain said connection, a thermostat controlling the extent and direction of operation of said driving means, and means operating automatically upon movement of said device toward closed position and into a predetermined partially-open position to deenergize said electromagnetically controlled means and thereby permit movement of said device to said closed position.

5. In a heating system, the combination of a valve device movable in opposite directions between open and closed positions to regulate the operation of a fuel burner of said system and normally tending to move to closed position, an electrically driven operator for moving said device in opposite directions and having a connection therewith adapted when released to permit of independent movement of the device to closed position, thermostatic means in the space to be heated, a switch adapted to be closed by said thermostatic means when less heat is required and controlling said operator to cause movement of said device toward closed position, a second switch adapted to be closed by said thermostatic means when calling for heat and controlling said operator to cause movement of said device toward open position, and means normally maintaining said connection and responsive to prolonged closure of said first mentioned switch for releasing said connection automatically.

6. In a temperature control system having a regulating device normally tending to move in one direction, the combination of a rotary element movable in opposite directions to actuate said device, electric motor driving means having a shaft rotatable in opposite directions, a driving gear train between said element and shaft having a gear rotatable about a fixed axis and a second gear bodily movable into and out of mesh therewith, means normally maintaining said gears in mesh and operable upon movement of said element into a predetermined position while moving in one direction to cause disengagement of said gears whereby to permit said first mentioned device to move independently of said driving means.

7. In a temperature control system having a regulating device normally tending to move in one direction, the combination of a rotary element movable in opposite directions to actuate said device, electric motor driving means having a shaft rotatable in opposite directions, a driving gear train between said element and shaft having a gear rotatable about a fixed axis and a second gear bodily movable into and out of mesh therewith, electromagnetically controlled means adapted when energized to maintain said second gear in mesh with said first gear and to release the gears when deenergized, an electric circuit controlling the energization of said last mentioned means, and means controlled by the movements of said element and normally acting to maintain said circuit closed but causing opening of the circuit when the element reaches a predetermined position.

8. In a system for controlling the movements of a heat regulating device between two limit positions, the combination of a power driven operator having a normally engaged releasable connection with said device, electromagnetically controlled means adapted when energized to maintain said connection and means operable to maintain said last mentioned means energized during movement of said device in one direction from one of said limit positions to the other but to cause deenergization of said means when said device reaches a predetermined intermediate position while moving in the opposite direction.

9. In a temperature control system having a regulating device normally tending to move in one direction, the combination of a rotary element movable in opposite directions to actuate said device, electric motor driving means having a shaft rotatable in opposite directions, a driving gear train between said element and shaft having a gear rotatable about a fixed axis and a second gear bodily movable into and out of mesh therewith, electromagnetically controlled means adapted when energized to maintain said second gear in mesh with said first gear and to release the gears when deenergized, a circuit adapted when closed to maintain said last mentioned means energized, means operated by said driving means and acting to interrupt said circuit when said element reaches a predetermined position while moving in said first mentioned direction but to maintain the circuit closed while the element is moving in the opposite direction through said position.

10. In a heating system, the combination of a valve device movable between open and closed positions to vary the amount of heat supplied by the system and normally tending to move toward closed position, electric motor driving means, a releasable driving connection between said driving means and said device adapted when released to permit the device to move to closed position independently of the driving means, electromagnetically controlled means adapted when energized to maintain said connection in driving condition, means operable as an incident to movement of said device into a predetermined partially-open position upon closing to cause deenergization of said last mentioned means, said electrically controlled means being reenergized when said valve device reaches closed position.

11. In a heating system, the combination of a valve device movable between open and closed positions to vary the amount of heat supplied by the system and normally tending to move toward closed position, electric motor driving means, a releasable driving connection between said driving means and said device adapted when released to permit the device to move to closed position independently of the driving means, electromagnetically controlled means adapted when energized to maintain said connection in driving condition, means operable as an incident to movement of said device into a predetermined partially-open position upon closing to cause deenergization of said electromagnetically controlled means and then reenergization thereof before the device reaches closed position, and means acting automatically to prevent reengagement of said connection until said device has reached closed position.

12. In a heating system, the combination of a valve device movable between open and closed positions to vary the amount of heat supplied by the system and normally tending to move toward closed position, electric motor driving means, a releasable driving connection between said driving means and said device adapted when released to permit the device to move to closed position independently of the driving means, electromagnetically controlled means adapted when energized to maintain said connection in driving condition, a switch controlling the energization of said last mentioned means, means operating upon movement of said device into a predetermined position while closing to open said switch and then to close the same before the device reaches closed position, and means rendered active by release of said connection to prevent reestablishment of the connection by closure of said switch until said device has reached said closed position.

13. In a system of the character described, the combination of a heat regulating device having open and closed positions and normally disposed between said open position and a predetermined partially-open position, an electric operator for driving said device in opposite directions having a normally engaged connection with said device adapted to be released to permit movement of the device to closed position independently of said operator, a cam follower controlling the engagement and disengagement of said connection, a cam movable with said device having a surface acting on said follower to maintain said connection engaged but adapted to cause movement of the follower into disengaged position when said device is in said partially-open position, and a second cam member having a lost motion connection with said first cam member and engageable with said follower so as to be shifted thereby through the range of its lost motion, a surface on said second cam member acting during shifting thereof while said device is moving through said partially-open position toward said open position to prevent movement of said follower in a direction to release said connection, said last mentioned surface being ineffectual during reverse movement of said device through said partially-open position.

14. In a system of the character described, the combination of a regulating device, electric motor driving means for moving said device variable distances in opposite directions and having a releasable connection therewith, a cam movable in opposite directions with said device, a follower for said cam operable to maintain said connection operative during movement of said device in one direction until the device reaches a predetermined position and then to release the connection, a second cam member having a lost motion connection with said first mentioned cam member and acting on said follower during movement of said device through said predetermined position while moving in the opposite direction to maintain said connection operative.

15. In a system of the character described, the combination of a regulating device, electric motor driving means therefor having a releasable driving connection therewith, a follower adapted when in active position to maintain said connection but to release the connection when moved to inactive position, a cam for said follower movable with said device and having a depression in its surface permitting movement of said follower from active to inactive position as said device passes a predetermined position while moving in one direction, a second cam shiftable relative to said first cam and adapted to be held against movement by said follower while said device is approaching said position while moving in the opposite direction, said second cam acting to hold said follower in active position while said depression is passing the follower as the device moves in said last mentioned direction through said position.

16. In a heating system, the combination of a regulating valve member, electric motor driving means therefor arranged to cause movement of said member in opposite directions between closed and open positions at a slow and graduated rate, a thermostat normally controlling said driving means to determine the direction and extent of movement of said member, control means operable upon movement of said member into a predetermined position under the control of said thermostat to cause immediate and rapid movement of the member to closed position independently of said thermostat, and means operating upon subsequent call of the thermostat for heat to control said driving means and cause movement of the member thereby to partially-open position.

17. In a heating system, the combination of a device movable toward and away from a limit position to vary the amount of heat supplied by the system, electric motor driving means for said device, thermostatic means normally controlling said driving means to determine the direction and extent of movement of said device, a circuit for said driving means adapted when closed to cause movement of said device away from said position independently of said thermostatic means, and means responsive to the movement of said device to control opening and closing of said circuit.

18. In a heating system, the combination of a regulating device movable between closed and open positions and normally tending to move toward closed position, electric motor driving means having a driving connection with said device adapted to be released automatically when the device reaches a predetermined partially-open position upon closing, a thermostat normally controlling said driving means to determine the direction and extent of movement of said device between open and said partially-open position, an auxiliary circuit for controlling said driving means independently of said thermostat to cause movement of said device to said partially-open position after release of said connection, and means for closing said circuit in the initial operation of said driving means in a direction to move said device out of closed position, said thermostat, when calling for heat with said device in closed position, initiating operation of said driving means to render said last mentioned means active.

19. In a heating system, the combination of a regulating device normally tending to move into a limit position, electric motor driving means having a driving connection with said device arranged to be released automatically when said device reaches a predetermined position in moving toward said first mentioned position, thermostatic means controlling said driving means to determine the direction and extent of movement of said device, a circuit controlling said driving means independently of said thermostatic means to cause movement of said device in a direction away from said first mentioned position, and means for maintaining said circuit closed until said device has passed beyond said predetermined position and then to open the circuit.

20. In a heating system, the combination of a regulating device movable between limit open and closed positions and normally tending to move into closed position, electric motor driving means having a normally engaged driving connection with said device adapted to be released automatically when said device reaches a predetermined partially-open position upon closing, said driving means having two windings selectively energizable to cause movement of said device toward closed and open positions respectively, thermostatic means controlling circuits through said windings in accordance with temperature changes in the space heated by said system, a parallel circuit for energizing said opening winding independently of said thermostatic means, and means acting to close said parallel circuit in the initial movement of said driving means in a direction to move said device from closed position toward open position and to maintain the circuit closed until the device has passed said partially-open position and then to open the switch.

21. In a heating system, the combination of a valve device movable in opposite directions toward and away from a closed position to vary the amount of heat supplied by said system, electric motor driving means for actuating said device, thermostatic means governing the operation of said driving means to determine the direction and extent of movement of the device thereby, a switch controlling an independent circuit for said driving means for causing movement of the device away from said position, a cam member movable with said device and acting during movement of the device toward said position to close said switch as the device reaches a predetermined partially-closed position and then to open the switch as the device reaches said closed position, and a second cam mounted for a limited degree of motion relative to said first cam member and cooperating therewith during movement of said device away from closed position to maintain said switch closed until said device has moved beyond said predetermined position and then to open said switch.

22. In a heating system, the combination of a valve device movable toward and from a closed position, electric motor driving means therefor, a switch controlling said driving means, a follower for actuating said switch, a cam movable with said device and engageable with said follower, and a second cam having a limited degree of lost motion relative to said first cam and adapted to engage said follower and be shifted thereby relative to the first cam during movement of said device in opposite directions, surfaces on said cams coinciding during movement of said device toward closed position and acting to cause movement of said follower into switch-closing position as the device passes a predetermined position and then to switch-opening position as the device approaches closed position, said surfaces acting on said follower successively to maintain said follower in switch-closing position during movement of the device away from closed position and until the device has passed beyond said predetermined position.

23. In a heating system, the combination of a valve device movable between open and closed positions, reversible electric motor driving means, an actuating member driven by said driving means for moving said device varying distances in opposite directions according to the duration of operation of said driving means, said member, when said device is in closed position, being adapted for a limited degree of independent motion relative to the device, thermostatically controlled means adapted to control said driving means to vary the extent and direction of movement of said member when said device is disposed between open and a predetermined partially-open position, said last mentioned means governing said driving means to initiate valve-opening movement of said member when the device is in closed position, means operating as an incident to movement of said device into said partially open position upon closing to cause movement of actuating member to valve-closed position independently of said driving means, and means rendered active in the valve-opening movement of said member before movement of said device out of closed position to take control of said driving means and continue the operation thereof independently of said thermostatically controlled means until said device has been moved at least to said partially-open position.

24. In a heating system, the combination of a valve device movable between closed and open positions to govern the amount of heat supplied by the system, an actuating member movable in opposite directions between two limit positions, electric motor driving means for said member, a driving connection between said member and said device having lost motion therein permitting of some degree of movement of the member in a valve-opening direction while the valve device remains in closed position, thermostatically controlled means for initiating operation of said driving means in a direction to open said valve device, and means rendered active by the movement of said member simultaneously with or before said lost motion has been taken up and operable to continue the operation of said driving means in a direction to open the valve device independently of said thermostatically controlled means.

25. In a heating system, the combination of a regulating device movable in opposite directions toward and from a closed position to vary the amount of heat supplied by the system, electric motor driving means for actuating said device, a circuit controlling the driving means to cause movement of said device toward said position, a thermostatically controlled switch in said circuit, a second switch in said circuit, a circuit controlling the driving means to cause movement of said device away from said position, a switch in said second circuit, and means operated by said driving means in the movement of said device toward said position to open said second switch and close said third switch as the device reaches a predetermined partially-closed position and then to open said third switch as the device reaches said closed position, said last mentioned means acting when said device is in closed position to maintain said second switch open.

26. In a heating system, the combination of a regulating device movable in opposite directions toward and from a closed position to vary the amount of heat supplied by the system, electric motor driving means for actuating said device, a circuit controlling the driving means to cause movement of said device toward said position, a thermostatically controlled switch in said circuit, a second switch in said circuit, a circuit controlling the driving means to cause movement of said device away from said position, a switch in said second circuit, means operated by said driving means in the movement of said device toward said position to open said second switch and close said third switch as the device reaches a predetermined partially-closed position and then to open said third switch as the device reaches said closed position, said last mentioned means operating upon movement of said device away from closed position to close said third switch, and means cooperating with said last mentioned means upon continued movement of the device away from said closed position to maintain said third switch closed until after the device has passed said predetermined position.

27. In a heating system, the combination of a valve device movable in opposite directions to vary the amount of heat supplied by the system, electric motor driving means operatively connected to said device and having two windings selectively energizable to cause movement of said device toward closed and open positions, a thermostat having two switches each in the circuit for one of said windings, means operable as an incident to movement of said device into a predetermined partially-open position to cause movement of the device to closed position independently of said driving means, a normally-closed limit switch in the circuit of the valve-closing winding arranged to be open when said valve is disposed between closed and said partially-open position, and means for energizing the circuit for said valve-opening winding independently of said thermostat switches and maintaining the latter circuit closed until the valve device has been moved at least to said partially open position.

28. In a system of the character described, the combination of a regulating device movable toward and from a closed position, electric motor driving means for said device, a switch controlling the driving means to effect movement toward said position, a second switch controlling the driving means to effect movement of the device away from said position through a predetermined partially-closed position, a cam follower for opening one of said switches and closing the other upon movement in opposite directions, a cam acting on said follower to open said first switch and close said second switch as said device passes said predetermined position in moving toward closed position and to open said second switch as the device reaches the latter position, a second cam acting on said follower upon reverse movement of said device to maintain said first switch open and said second switch closed until after the device has passed said predetermined position and then to close said first switch and open the second switch, said second cam acting when said device is in closed position to maintain said first mentioned switch open.

29. In a system of the character described, the combination of a regulating device, electric motor driving means for moving said device back and forth between two limit positions at a slow and graduated rate, a switch controlling the action of said driving means, a follower for actuating said switch, a cam member movable with said device and acting on the follower upon movement of the device in one direction to cause actuation of said switch at a predetermined position of the device, a second cam member mounted for a limited degree of movement relative to the first cam member and adapted to engage said follower and be shifted thereby during movement of the device in one direction, said second cam member causing actuation of said switch at a different position of said device.

30. In a system of the character described, the combination of a regulating device, electric motor driving means for moving said device back and forth between two limit positions at a slow and graduated rate, a switch controlling the action of said driving means, and means movable with said device and operable to actuate said switch at one predetermined position when said device is being moved in one direction by said driving means and at a different position when the device is being moved in the opposite direction.

31. In a temperature control system, the combination of a regulating valve member, a power driven operator for the valve member, and a thermostat controlling said operator to cause normal regulating movements to be imparted to the valve member through varying distances in opposite directions according to intervals during which the thermostat calls for or ceases to call for heat, said operator having means acting, when the valve member is moved in a closing direction into a predetermined partially open position, to cause the member to be moved by the operator into fully closed position independently of said thermostat.

32. In a temperature regulating system, the combination of a regulating valve member, a power driven operator including an actuating element driven thereby for actuating said valve member, and a thermostat controlling said operator so as to impart slow and graduated normal regulating movements to the valve member through varying distances in opposite directions within a range between a fully open position and a predetermined partially open position, said operator further including means operable by said element to cause the valve member to move into fully closed position by the operator as an incident to the movement of the valve member in a closing direction into said partially open position.

33. In a system of the general character described, the combination of a regulating member movable in opposite directions between two limiting positions, a power operator for actuating said member having electric motor driving means, a control instrumentality governing the operation of said driving means to determine the extent and direction of movement of the member thereby between one of said positions and an intermediate position and also to initiate movement of the member out of said other limiting position, means rendered operative in the movement of said member into said intermediate position from said first mentioned limit position to control said operator independently of said instrumentality and cause movement of the member to said second mentioned limiting position, and means operable upon movement of said member from said second limit position back to said intermediate position to again place said instrumentality in exclusive control of said driving means.

34. In a system of the general character described, the combination of a regulating member movable in opposite directions toward a first limiting position and a second limiting position, a power operator for actuating said member having electric driving means including two windings selectively energizable to determine the direction and extent of movement of said member in opposite directions between said first limiting position and an intermediate position, a control instrumentality having exclusive control of said windings when said member is between said last mentioned positions, other means responsive to the movement of said member toward said second limiting position and acting automatically when the member reaches said intermediate position to control said operator and cause movement of said member to said second limiting position independently of said instrumentality, and means operable upon the return of said member to said intermediate position to again place said windings within the exclusive control of said instrumentality.

GEORGE FORREST DRAKE.